United States Patent [19]
Behl

[11] Patent Number: 5,862,037
[45] Date of Patent: Jan. 19, 1999

[54] PC CARD FOR COOLING A PORTABLE COMPUTER

[75] Inventor: Sunny Behl, San Jose, Calif.

[73] Assignee: Inclose Design, Inc., Campbell, Calif.

[21] Appl. No.: 811,119

[22] Filed: Mar. 3, 1997

[51] Int. Cl.[6] .............................. G06F 1/20; H05K 7/20
[52] U.S. Cl. ......................... 361/687; 361/695; 361/699
[58] Field of Search ................... 361/687, 688, 361/689, 690, 694, 695, 697, 698, 699; 165/80.2, 80.3, 80.4, 165; 364/708.1

[56] References Cited

U.S. PATENT DOCUMENTS

| | | | |
|---|---|---|---|
| 5,412,534 | 5/1995 | Cutts et al. | 361/695 |
| 5,475,563 | 12/1995 | Donahoe et al. | 361/695 |
| 5,636,103 | 6/1997 | Bushner | 361/695 |
| 5,689,654 | 11/1997 | Kikinis et al. | 361/686 |
| 5,694,294 | 12/1997 | Ohashi et al. | 361/687 |

*Primary Examiner*—Lynn D. Feild
*Attorney, Agent, or Firm*—Kevin Fortin, Esq.

[57] ABSTRACT

A PCMCIA PC card powers a fan for cooling a portable computer. The card having a first end, a second end, and defines an air conduit between the ends. A fan attaches to the first end for blowing air towards the second end and into a portable computer. A PC card connector attaches to the second end for attaching the PC card to the PC slot of the computer and for powering the fan. The card includes a fin in the air conduit for directing air from the fan to past the PC card connector.

13 Claims, 2 Drawing Sheets

PC CARD FOR COOLING A PORTABLE COMPUTER

FIELD OF THE INVENTION

This invention relates to portable computers having PC card slots and more particularly to devices for cooling the portable computers.

BACKGROUND OF THE INVENTION

In the early 1990's, the rapid growth of mobile computing drove the development of smaller, lighter, and more portable tools for information processing. One exciting innovation was the development of PC Card technology. The power and versatility of PC Cards quickly made them standard equipment in many mobile computers. The rapid development and worldwide adoption of PC Card technology has been due in large part to the standards efforts of the Personal Computer Memory Card International Association (PCMCIA).

The PCMCIA's PC Card Standard is now bringing the benefits of these same PC Cards to a variety of industries and vertical applications, including smart cards, set-top boxes, automobiles, and others. The PC Card technology's compact size and ruggedness make it the ideal technology for a wide variety of applications.

The present PC Card Standard provides physical specifications for three types of PC Cards, with additional provisions for extended cards. All three card types measure the same length and width and use the same 68-pin connector. The only geometrical difference between the card types is thickness. The thickness' are 3.3, 5.0, and 10.5 millimeters for Type I, Type II, and Type III cards respectively. Because they differ only in thickness, a thinner card can be used in a thicker slot, but a thicker card can not be used in a thinner slot.

The card types each have features that fit the needs of different applications. Type I PC Cards are typically used for memory devices such as RAM, Flash, OTP, and SRAM cards. Type II PC Cards are typically used for I/O devices such as data/fax modems, LANs, and mass storage devices. Type III PC Cards are used for devices whose components are thicker, such as rotating mass storage devices.

Extended cards allow the addition of components that must remain outside the system for proper operation, such as antennas for wireless applications. The release number refers to the version of the PC Card Standard that a particular card or system was based on. Basically, release 1.0 supported memory only, and 2.X releases supported memory and I/O applications.

PCMCIA Standard Release 1.0/JEIDA 4.0—June 1990

The first release of the standard defined the 68-pin interface and the Type I and Type II PC Card form factors. The initial release of the PCMCIA Standard specified the electrical and physical requirements for memory cards only. It defined the Metaformat or Card Information Structure (CIS) that is critical to interoperability and plug-and-play for PC Cards. There was no concept of input/output (I/O) cards in the first release of the PC Card Standard.

PCMCIA Standard, Releases 2.0, 2.01 and 2.1— 1991–1994

The second release of the standard defined an I/O interface for the same 68-pin interface as was used for the PCMCIA memory cards in the first release of the Standard. Release 2.0 also added various clarifications to the first release, support for dual-voltage memory cards, and sections dealing with card environmental requirements and test methods. Release 2.01 added the PC Card ATA specification, the Type III card type, and the Auto-Indexing Mass Storage (AIMS) specification geared toward digital images was also added. It also included the initial version of the Card Services Specification. Release 2.1 further enhanced the Card and Socket Services Specification, and made improvements to the Card Information Structure.

PC Card Standard-February 1995

The latest release of the PC Card Standard added information to improve compatibility and added support for features such as 3.3 volt operation, DMA support, and 32-bit CardBus busmastering.

The rapid rate of adoption of PC Card slots has driven a steady stream of card and host implementations. During that time, PC Cards containing new technologies were introduced and significant new capabilities were added to the Standard. At the same time considerable experience was gained by card, host, and software vendors, and opportunities to improve compatibility were recognized.

PCMCIA's goal is to make the technology as easy to use as possible, however, the Standard can only provide guidelines in some areas so there will be manufacturers who do not follow the Standard exactly or have interpreted it differently. Therefore, development planned for flexibility and adaptability will allow for the greatest compatibility. One way to be prepared for the variety of the real world is to perform exhaustive testing of designs with all the significant components from software functions and modules to entire platforms.

Three major factors that have come together to greatly improve PC Card interoperability. In the March 1995 release of the standard, the software specification for PC Cards were improved in a number of ways. Improvements to the Card Information Structure and the guidelines for its usage improved the way that hosts recognize the features and requirements for a card when inserted. Also part of the March 1995 release was the addition of the Guidelines document, a series of recommended guidelines for developers of specific types of PC Cards, such as modems, wireless devices, ATA cards and CardBus cards.

In addition, increasing cooperation between card, host and software developers within the industry has resulted in improved interoperability. Towards this end, PCMCIA and the Plug and Play Association regularly co-sponsor PlugFest Interoperability Workshops that bring together leading manufacturers from all parts of the industry. Additional advancements are expected.

There are various problems facing portable computer manufactures and users. One major problem, due to the fact that many electronic devices are compacted into a small case, is heat buildup. The INTEL PENTIUM® class processor, for example, is known for generating excessive amounts of heat. Disk drives, and other components, also generate significant amounts of heat. In a small case such as a laptop computer, these and other devices can overheating and ultimately, failure of the portable computer. Overheating may also decrease the mean time between failure of electronic components. What is desired is a convenient way to cool portable computers.

SUMMARY OF THE INVENTION

The present invention includes an apparatus for cooling an electronic device having a PC slot. The electronic device may be a portable computer, or other type of device which includes PCMCIA type PC slots. According to the invention, the cooling apparatus inserts into a PC slot to introduce cool air into an electronic device such as a portable computer.

The card has a first end, and a second end with at least one air vent and an air conduit between the first end and the vent. The second end inserts into a PC slot for positioning the vent in the PC slot and for cooling the electronic device.

A fan attaches to the first end for blowing air through the air conduit and the vent. The fan circulates air though the PC slot and cool the electronic device. A electrical connector mounts on the second end and couples to the fan for powering the fan.

According to one aspect of the invention, the cooling apparatus has a grill and an air filter. The grill and the air filter attach to the first end of the card to protect the fan and to filter air, respectively. The air filter is removable to facilitate cleaning of the air filter.

According to another aspect of the invention, the second end of the card includes vents and fins. The fins attach to the conduit to direct air through the vents. The vents direct air into the electronic equipment (e.g. portable computer) when the second end inserts into the PC slot.

According to another aspect of the invention, the first end includes an inlet, the vent of the second end is an outlet, and the fan blows air from the inlet and through the outlet.

BRIEF DESCRIPTION OF THE DRAWING

For a further understanding of the advantages of the present invention, reference should be given to the following detailed description, taken in conjunction with the accompanying drawing, in which like parts have like reference numerals and wherein.

DETAILED DESCRIPTION

Figure 1:
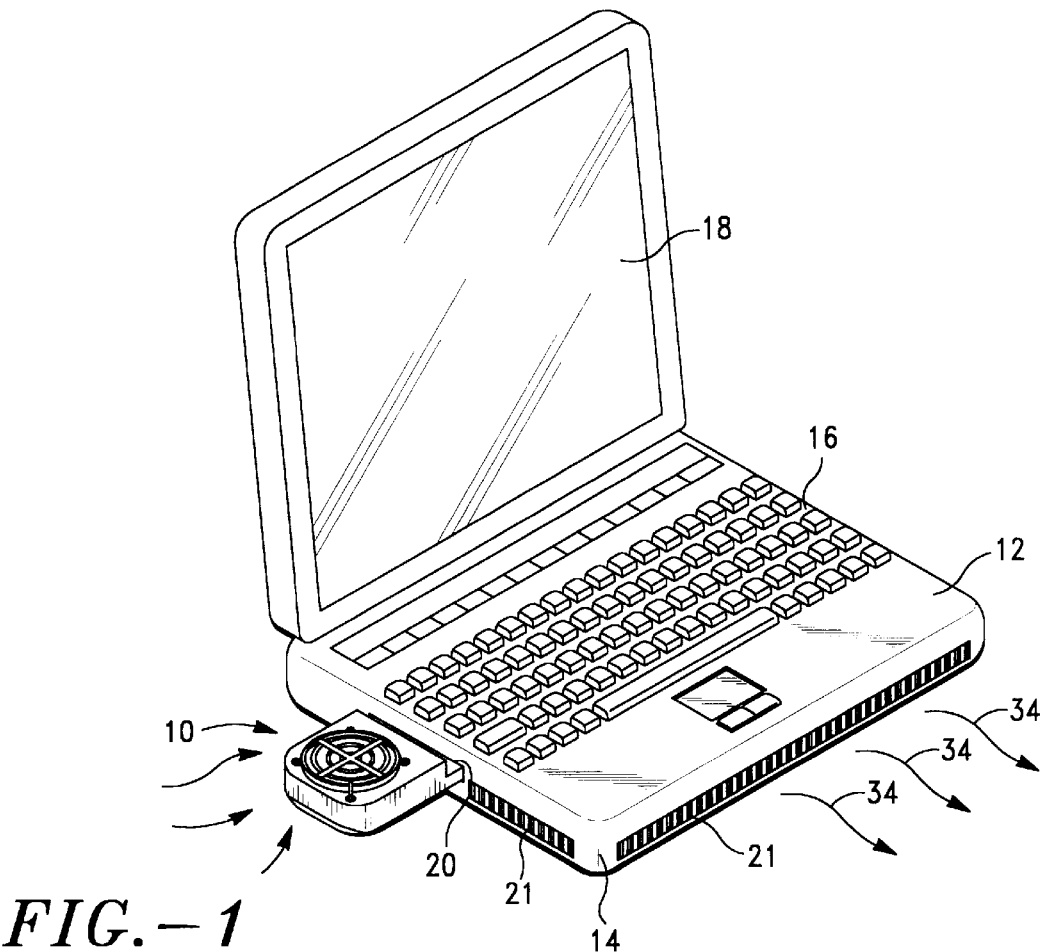
FIG. 1 is a perspective view of the present invention.

FIG. 1 shows a cooling apparatus, generally designated with the reference numeral 10, attached to a portable computer 12 in accordance with the present invention. The portable computer 12 includes a base 14, a viewing screen 18, a keyboard 16. The base 14 includes PC card slot 20. The viewing screen 18 foldably attaches to the base 14 and folds to cover the keyboard 16 and enable portability of the computer.

The PC card slot 20 is made in accordance with PCMCIA PC card standards. According to one aspect of the invention, the PC card slot is adapted for PCMCIA Type III PC cards. According other aspects of the invention, the PC card slot is adapted for Type II and Type I PC cards, respectively.

The computer 12 includes vents 21. The cooling apparatus 10 blows relatively cool air into the PC card slot 12 to convectively cool the computer 12. The cooling apparatus 10 pushes hot air out from the vents 21 in the direction of the arrows 34.

In an alternate embodiment, the computer 12 has a non-air tight base which allows air blown by the cooling apparatus 10 to escape the computer 12. Accordingly, the cooling apparatus 10 may be retrofit on to virtually any portable computer having a PC slot. The cooling apparatus 10 may be used with virtually any device having PC slot.

As the PCMCIA standards evolve, it can be appreciated, that a the present invention may be adapted to any of a variety of variety of newly evolved PC card slots 20 to cool the portable computer 12. Additionally, the present invention may be used in a variety of other applications beyond the use in a computer e.g. set-top boxes, automobiles and any other application where PC cards may be used.

Figure 2:
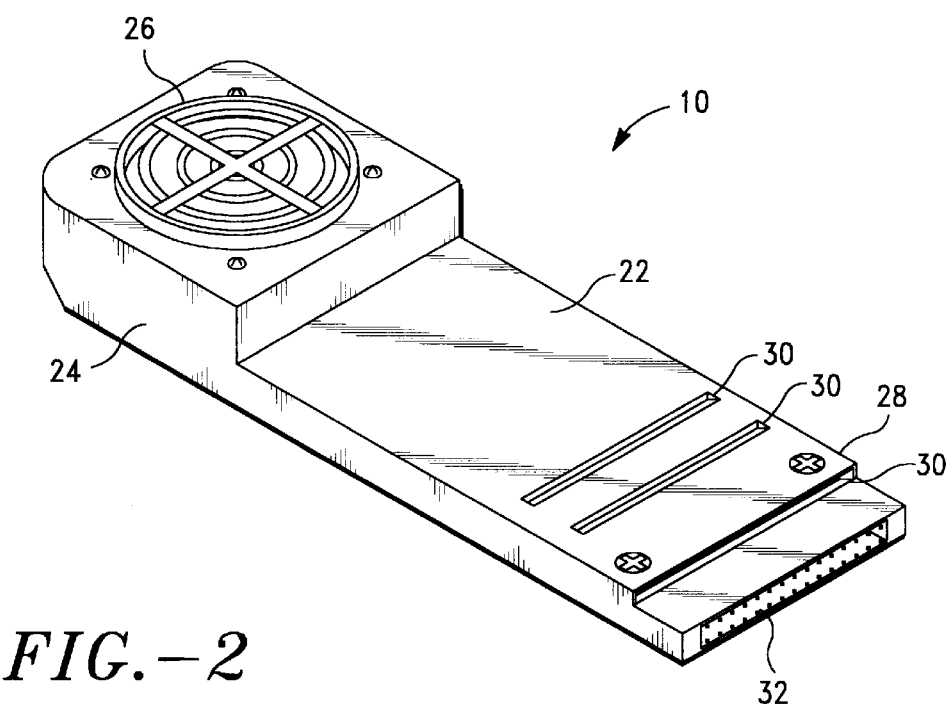
FIG. 2 is a perspective view of the cooling apparatus of FIG. 1.

FIG. 2 shows an embodiment of the cooling apparatus 10 in accordance with the present invention. The apparatus 10 includes a hollow card 22. The card 22 has a first end 24 with an air inlet 26. The card 22 has a second end 28 with at least one air vent 30.

The second end includes an electrical connector 32. The connector 32 is a standard PCMCIA PC card connector having 68 pin contacts which attach the card 22 to the portable computer 10 (FIG. 1). The connector 32 holds the card vents 30 within the PC slot. The vents 30 direct air into the portable computer 12 to cool the computer 12 when the card 22 connects to the PC slot 20 (FIG. 1) and the fan operates.

Figure 3:
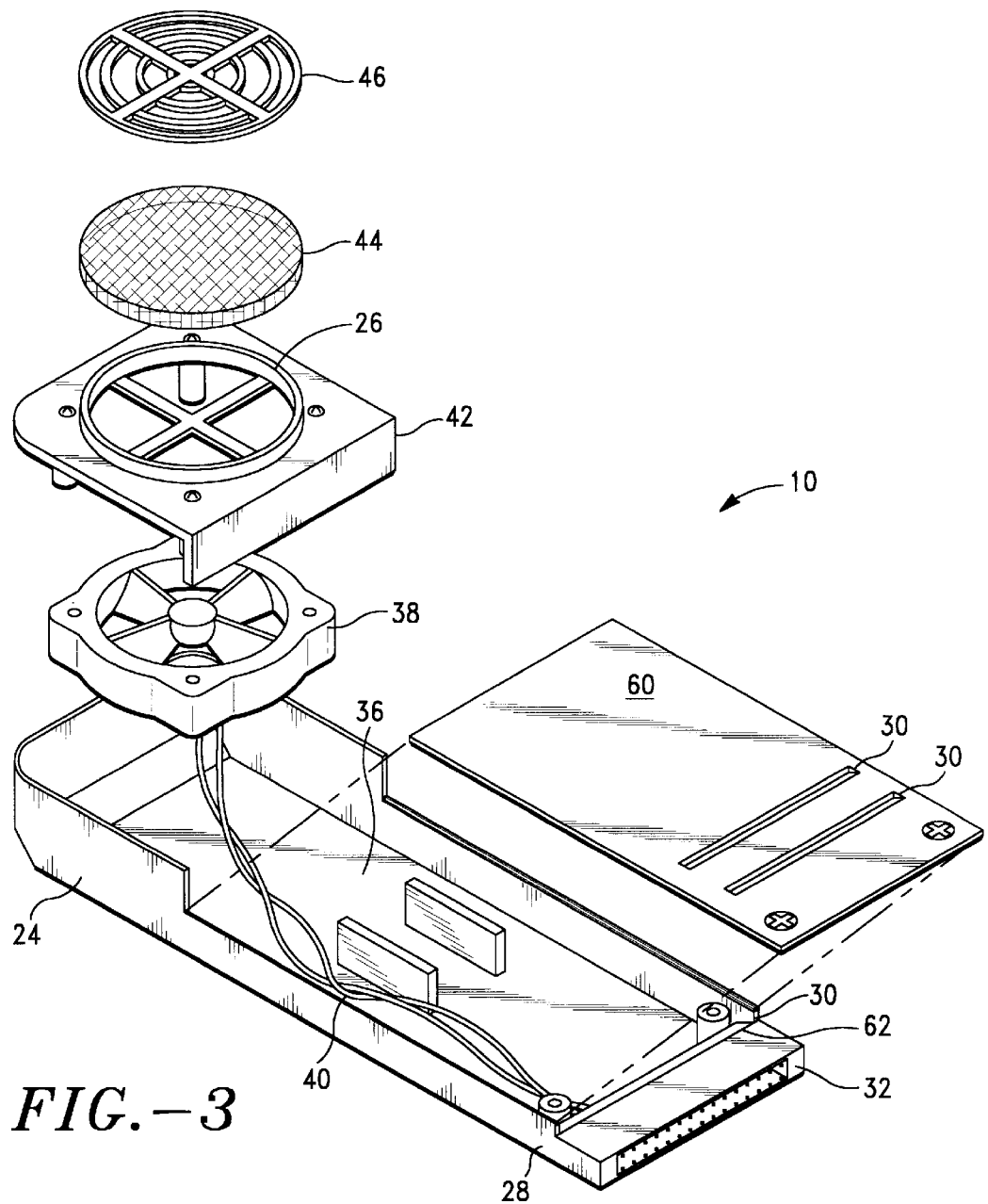
FIG. 3 is an exploded view of the cooling apparatus of FIG. 2.

FIG. 3 shows the cooling apparatus 10. The card 22 includes an air conduit 36 which extends between the first end 24 and the second end 28.

The card 22 includes a fan 38. The fan 38 attaches to the first end 24 for blowing air through the air conduit 36. When, for example, the fan 38 draws air through the air inlet 26, the fan forces the air through the air conduit 36 and out of the second end 28 via the vents 30.

The fan 38 includes a lead 40 which couples the fan 38 to the electrical connector. The electrical connector 32 rigidly mounts on the second end 28 of the card. The fan 38 rigidly mounts on the first end 24 of the card 22. When the electrical connector 32 attaches to the PC slot 20 of the computer 12 (FIG. 1), and the computer 12 operates, the connector 32 delivers power to the fan 38.

The fan 38 removeably attaches to the first end 24 of the card 22. Removable attachment enables the fan to be replaced, repaired or cleaned as necessary.

According to one aspect of the invention, the cooling apparatus includes a fan mount 42 which attaches the fan 38 to attach to the card 22. The fan mount 42 includes a grill 46 and an air filter 44. The grill 46 and the air filter 44 protect the fan 38. The fan 38 filters air to minimize dust buildup within the computer 12. The grill 46 snaps on an off to ease removal of the air filter 44 for cleaning.

The includes a top face 60 and an end face 62, the top face defines a pair of fins and vents 30, the fins direct air from the fan 38 through the vents, the end face 62 defines the vent 30.

Figure 4:
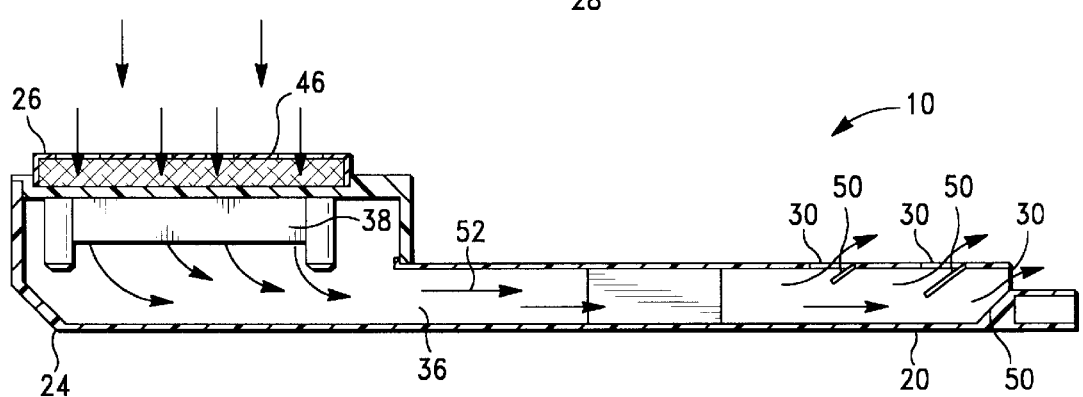
FIG. 4 is a cross-sectional view of the cooling apparatus of FIG. 2.

FIG. 4 shows air flow though the cooling apparatus 10. The fan 38 operates continuously and rotates to draw air into the inlet 26 of the first end. The fan forces air through the air conduit to the second end 28. Air exits the second end 28 through the vents 30. Each vent 30 includes a vent fin 50. The fins 50 attach to the vents 22 within the air conduit 30. The vent fins 50 are angled with respect to the air flow direction 52 within the conduit to direct air outwards from the vents 30.

Although the fan 38 directs air out through the vents 30 as shown, it can be appreciated that the fan can be reversed to also draw air into the vents 30 and out through the first end 24.

While the foregoing detailed description has described several embodiments in accordance with the present invention, the reader should understand that the above description is illustrative only and not limiting of the disclosed invention. It will be appreciated that the embodiments discussed above and the virtually infinite embodiments that are not mentioned could easily be within the scope and spirit of this invention. Thus, the invention is to be limited only by the claims as set forth below.

We claim:

1. An apparatus for cooling an electronic device having a PC slot, comprising:

a card having a first end, and a second end with at least one air vent, the card defines an air conduit between the first end and the vent;

the second end being insertable into a PC slot for positioning the vent in the PC slot;

a fan attaching to the card for blowing air through the air conduit and the vent to circulate air though the PC slot and cool the electronic device; and an electrical connector mounting on the second end and being coupled to the fan for powering the fan.

2. An apparatus for cooling an electronic device having a PC slot, comprising:

a card having a first end, and a second end with at least one air vent, the card defines an air conduit between the first end and the vent;

the second end being insertable into a PC slot for positioning the vent in the PC slot;

a fan attaching to the card for blowing air through the air conduit and the vent to circulate air though the PC slot and cool the electronic device;

an electrical connector mounting on the second end and being coupled to the fan for powering the fan; a grill and an air filter, the grill and the air filter attach to the first end of the card to protect the fan and to filter air, respectively, the air filter is removable to facilitate cleaning of the air filter.

3. An apparatus as set forth in claim 1, wherein the second end of the card includes vents and fins, the fins attach to the conduit to direct air through the vents, the vents direct air into the electronic device when the second end inserts into the PC slot.

4. An apparatus as set forth in claim 1, wherein the first end includes an inlet, the vent of the second end is an outlet, and the fan blows air from the inlet and through the outlet.

5. An apparatus as set forth in claim 1, wherein the fan removeably snaps to the first end of the card.

6. An apparatus as set forth in claim 1, wherein the card has a geometry conforming to PCMCIA Type III geometry specifications.

7. A portable computer, comprising:

a base having a keyboard and a PC slot;

a viewing screen foldably attached to the base;

a card having a first end, and a second end with an electrical connector, the card defines an air conduit between the first end and the second end, the card being insertable into the PC slot;

a fan attached to the first end to force air into the base for cooling the portable computer;

a lead coupled between the fan and the electrical connector for providing power to the fan when the card attaches to the PC slot of the computer.

8. A portable computer as set forth in claim 7, wherein the second end of the card includes vents, the vents direct air into the base of the portable computer.

9. A portable computer as set forth in claim 7, wherein the portable computer includes vents for allowing air from the fan to exit the base.

10. A portable computer as set forth in claim 7, wherein the card includes a top face and an end face, the top face defines a pair of fins and vents, the fins direct air from the fan through the vents, the end face defines a vent, one fin is contoured to direct air from the fan over the electrical connector and out of the conduit through the end face vent.

11. A portable computer as set forth in claim 7, wherein the fan operates continuously when attached to the computer.

12. An apparatus for cooling a portable computer having a PC slot, comprising:

a PC card having a first end, and a second end, the card defines an air conduit between the first end and the second end, and the second end forms at least one vent which communicates the air conduit;

a fan attached to the first end for blowing air through the air conduit and towards the vent;

an electrical connector attached to the second end for attaching the PC card to the PC slot of the computer;

a fin attached to the card, near the second end for directing blown air out from the vent; and a lead coupled between the fan and the electrical connector for delivering power from the computer to the fan when the PC card attaches to the PC slot of the computer.

13. A cooling apparatus as set forth in claim 12, wherein the PC card includes a top face and an end face, the top face defines a pair of fins and vents, the fins direct air from the fan through the vents, the end face defines a vent, the vent is contoured to direct air from the fan, over the connector and out of the conduit through the end face vent.

* * * * *